(12) United States Patent
Yamaguchi et al.

(10) Patent No.: US 10,707,539 B2
(45) Date of Patent: Jul. 7, 2020

(54) BATTERY

(71) Applicant: MURATA MANUFACTURING CO., LTD., Kyoto (JP)

(72) Inventors: Akira Yamaguchi, Fukushima (JP); Kunihiko Hayashi, Kanagawa (JP); Tadahiko Kubota, Kanagawa (JP); Hiroyuki Suzuki, Chiba (JP); Akira Ichihashi, Fukushima (JP); Yuzuru Fukushima, Miyagi (JP); Hironori Sato, Aichi (JP); Masaki Kuratsuka, Fukushima (JP); Hideto Watanabe, Fukushima (JP); Kimio Tajima, Fukushima (JP); Masahiro Miyamoto, Fukushima (JP)

(73) Assignee: Murata Manufacturing Co., Ltd., Kyoto (JP)

( * ) Notice: Subject to any disclaimer, the term of this patent is extended or adjusted under 35 U.S.C. 154(b) by 356 days.

(21) Appl. No.: 15/816,588

(22) Filed: Nov. 17, 2017

(65) Prior Publication Data
US 2018/0076490 A1    Mar. 15, 2018

Related U.S. Application Data

(63) Continuation of application No. 14/084,316, filed on Nov. 19, 2013, now Pat. No. 9,831,532, which is a (Continued)

(30) Foreign Application Priority Data

Nov. 13, 2007    (JP) ................. 2007-294337

(51) Int. Cl.
*H01M 10/42* (2006.01)
*H01M 4/505* (2010.01)
(Continued)

(52) U.S. Cl.
CPC ....... *H01M 10/4235* (2013.01); *H01M 2/022* (2013.01); *H01M 2/024* (2013.01);
(Continued)

(58) Field of Classification Search
None
See application file for complete search history.

(56) References Cited

U.S. PATENT DOCUMENTS

| | | | |
|---|---|---|---|
| 6,458,490 B1 | 10/2002 | Hommura et al. | |
| 8,609,286 B2 | 12/2013 | Yamaguchi et al. | |

(Continued)

FOREIGN PATENT DOCUMENTS

| | | |
|---|---|---|
| JP | 05-325985 | 12/1993 |
| JP | 07-11967 | 2/1995 |

(Continued)

OTHER PUBLICATIONS

Japanese Office Action (JP2007-294337) dated Dec. 1, 2009.
(Continued)

*Primary Examiner* — Christopher P Domone
(74) *Attorney, Agent, or Firm* — K&L Gates LLP

(57) ABSTRACT

A battery is provided including an anode, a cathode and an electrolyte; wherein the electrolyte includes one or both of fluoro ethylene carbonate and difluoro ethylene carbonate in an amount of 0.5% by mass or more and 10% by mass or less, wherein the anode includes an anode active material layer provided on an anode current collector, and wherein a thickness of the anode active material layer, after charging the battery, is 58 um or more and 75 um or less.

25 Claims, 2 Drawing Sheets

Related U.S. Application Data continuation of application No. 12/257,949, filed on Oct. 24, 2008, now Pat. No. 8,609,286.

(51) Int. Cl.

| | | |
|---|---|---|
| *H01M 2/02* | (2006.01) | |
| *H01M 2/16* | (2006.01) | |
| *H01M 2/26* | (2006.01) | |
| *H01M 2/30* | (2006.01) | |
| *H01M 2/34* | (2006.01) | |
| *H01M 4/131* | (2010.01) | |
| *H01M 4/133* | (2010.01) | |
| *H01M 4/36* | (2006.01) | |
| *H01M 4/525* | (2010.01) | |
| *H01M 10/0587* | (2010.01) | |
| *H01M 10/0569* | (2010.01) | |
| *H01M 10/0568* | (2010.01) | |
| *H01M 10/0525* | (2010.01) | |
| *H01M 10/052* | (2010.01) | |
| *H01M 4/62* | (2006.01) | |
| *H01M 4/04* | (2006.01) | |
| *H01M 4/1391* | (2010.01) | |
| *H01M 4/1393* | (2010.01) | |
| *H01M 4/02* | (2006.01) | |

(52) U.S. Cl.
CPC ......... *H01M 2/162* (2013.01); *H01M 2/1653* (2013.01); *H01M 2/263* (2013.01); *H01M 2/30* (2013.01); *H01M 2/305* (2013.01); *H01M 2/345* (2013.01); *H01M 4/131* (2013.01); *H01M 4/133* (2013.01); *H01M 4/364* (2013.01); *H01M 4/505* (2013.01); *H01M 4/525* (2013.01); *H01M 4/623* (2013.01); *H01M 4/625* (2013.01); *H01M 10/052* (2013.01); *H01M 10/0525* (2013.01); *H01M 10/0568* (2013.01); *H01M 10/0569* (2013.01); *H01M 10/0587* (2013.01); *H01M 4/0404* (2013.01); *H01M 4/0433* (2013.01); *H01M 4/1391* (2013.01); *H01M 4/1393* (2013.01); *H01M 2004/021* (2013.01); *H01M 2004/027* (2013.01); *H01M 2004/028* (2013.01); *H01M 2200/20* (2013.01); *H01M 2220/20* (2013.01); *H01M 2220/30* (2013.01); *Y02E 60/122* (2013.01); *Y02P 70/54* (2015.11); *Y02T 10/7011* (2013.01)

(56) References Cited

U.S. PATENT DOCUMENTS

| | | | |
|---|---|---|---|
| 2004/0229128 | A1 | 11/2004 | Noh |
| 2005/0031963 | A1* | 2/2005 | Im ................. H01M 10/0569 429/332 |
| 2005/0050319 | A1 | 3/2005 | Suraski |
| 2007/0026315 | A1* | 2/2007 | Lampe-Onnerud ... H01M 4/131 429/224 |
| 2008/0124631 | A1* | 5/2008 | Fukui ................. H01M 4/0404 429/217 |
| 2008/0241670 | A1 | 10/2008 | Kim et al. |

FOREIGN PATENT DOCUMENTS

| | | |
|---|---|---|
| JP | 07-240232 | 9/1995 |
| JP | 10-144353 | 5/1998 |
| JP | H11-40199 A | 2/1999 |
| JP | 2001-006747 A | 1/2001 |
| JP | 2001-093572 | 4/2001 |
| JP | 2001-118569 | 4/2001 |
| JP | 2001-126760 | 5/2001 |
| JP | 2003-217569 | 7/2003 |
| JP | 2004-206959 | 7/2004 |
| JP | 2004-335132 | 11/2004 |
| JP | 2005-078820 | 3/2005 |
| JP | 2006-236752 | 9/2006 |
| JP | 2006-244833 | 9/2006 |
| JP | 2006-332020 | 12/2006 |
| JP | 2007-042329 | 2/2007 |
| JP | 2007-504628 | 3/2007 |
| WO | 2006-033358 | 3/2006 |
| WO | 2007-114168 | 10/2007 |

OTHER PUBLICATIONS

Korean Office Action (10-2008-0112017) dated Jan. 26, 2015.
Korean Office Action (10-2008-0112017) dated Sep. 17, 2015.
Korean Office Action (10-2016-0090704) dated Aug. 22, 2016.
Decision of Refusal in Korean Application No. 10-2016-0090704 dated Feb. 17, 2017.
Notification of Reasons for Refusal in Korean Application No. 10-2017-0062098 dated Jun. 29, 2017.

\* cited by examiner

BATTERY

CROSS REFERENCES TO RELATED APPLICATIONS

The present application is a continuation of U.S. application Ser. No. 14/084,316, filed on Nov. 19, 2013, which is a continuation of U.S. application Ser. No. 12/257,949, filed on Oct. 24, 2008, which claims priority to Japanese Patent Application JP 2007-294337 filed in the Japanese Patent Office on Nov. 13, 2007, the entire contents of which is being incorporated herein by reference.

BACKGROUND

The present application relates to a nonaqueous electrolyte secondary battery. More specifically, the present application relates to a nonaqueous electrolyte secondary battery with high-power characteristics.

Recently, a lot of portable electronic equipment such as camera-integrated VTRs (videotape recorder), cellular phones, or notebook computers has appeared and it is contemplated to reduce the size and weight thereof. In response to the need, as an power supply of these electronic equipment, development for a secondary battery that is lightweight and capable of obtaining a high energy density has been proceeding. As the secondary battery capable of obtaining a high energy density, for example, a lithium-ion secondary battery is known.

In recent years, various researches have been made to improve characteristics of the lithium-ion secondary battery. The research on high-power characteristics is one of the most intensely studied research areas. For example, in Japanese Patent Application Laid-Open (JP-A) No. 2001-126760, a high-power and long-life battery has been developed by using ethylene carbonate, propylene carbonate, and dimethyl carbonate as solvents. For this reason, the lithium-ion secondary battery has been widely used for other applications including portable electronic equipment such as cellular phones or laptop computers. In the past, for example, a nickel-cadmium battery that is heavy and large and a nickel hydrogen secondary battery have been used for equipment that discharges a large current (e.g. power tools). In place of these batteries, the lithium-ion secondary battery that is small and lightweight has recently been used. Further, electrical vehicles and hybrid vehicles have recently been attracting attention from an environmental point of view. The use of the lithium-ion secondary battery as the battery for these vehicles has been considered. In the battery of such an automotive application, it is necessary to further emphasize the safety because a large current is discharged.

Incidentally, lithium-ion secondary batteries in the past are equipped with a Positive Temperature Coefficient (PTC element) to ensure safety (for example, refer to JP-A Nos. 2004-206959 and 10-144353). The PTC element has a feature that the resistance value of the PTC element is increased to block an electric current flowing into the battery when a large electric current flows into the battery or the temperature of the battery is higher. Thus, in the battery having the PTC element, external short circuit is generated and the PTC element operates to stop an electric current flow of the battery when the temperature of the battery reaches a predetermined temperature. As a result, abnormal generation of heat of the battery caused by a large current flow is prevented and the safety of the battery is ensured.

SUMMARY

However, the PTC element operates when discharging is performed with a large electric current. Therefore, it is difficult to equip batteries used in discharging with large currents which are used for vehicles and power tools with the PTC element. That is, it is difficult to balance high-power characteristics and safety in a lithium-ion secondary batteries in related art.

Therefore, it is desirable to provide a nonaqueous electrolyte secondary battery capable of balancing high-power characteristics and safety.

According to an embodiment, there is provided a non aqueous electrolyte secondary battery including a cathode capable of being electrochemically doped/dedoped with lithium, an anode capable of being electrochemically doped/dedoped with lithium, and an electrolyte placed between the cathode and the anode, wherein the electrolyte contains at least one of fluoro ethylene carbonate represented by Chemical Formula (1) and difluoro ethylene carbonate represented by Chemical Formula (2) as a solvent and the ratio of a discharge capacity B during discharging at a 5 C rate to a discharge capacity A during discharging at a 0.2 C rate ((B/A)×100) is 80% or more.

[Chemical Formula 1]

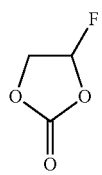

(1)

[Chemical Formula 2]

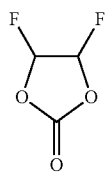

(2)

In an embodiment, at least one of fluoro ethylene carbonate and difluoro ethylene carbonate is included as an electrolytic solvent and thus it is estimated that a stable coating film is formed on the surface of an electrode. It is considered that the temperature rise at the time of external short circuit can be suppressed when such a coating film is formed on the electrode of the nonaqueous electrolyte secondary battery capable of discharging at high rates.

In an embodiment, the term "1 C" means a current value when the rated capacity of the battery is discharged with constant current for 1 hour, the term "5 C" means a current value when the rated capacity of the battery is discharged with constant current for 0.2 hour, and the term "0.2 C" means a current value when the rated capacity of the battery is discharged with constant current for 5 hours.

According to an embodiment, the safety of the nonaqueous electrolyte secondary battery can be ensured without using the PTC. Therefore, the balance between high-power characteristics and safety can be achieved.

Additional features and advantages are described herein, and will be apparent from the following Detailed Description and the figures.

DETAILED DESCRIPTION

Hereinafter, embodiments of the present application will be described with reference to the accompanying drawings.
(Structure of Secondary Battery)

Figure 1:
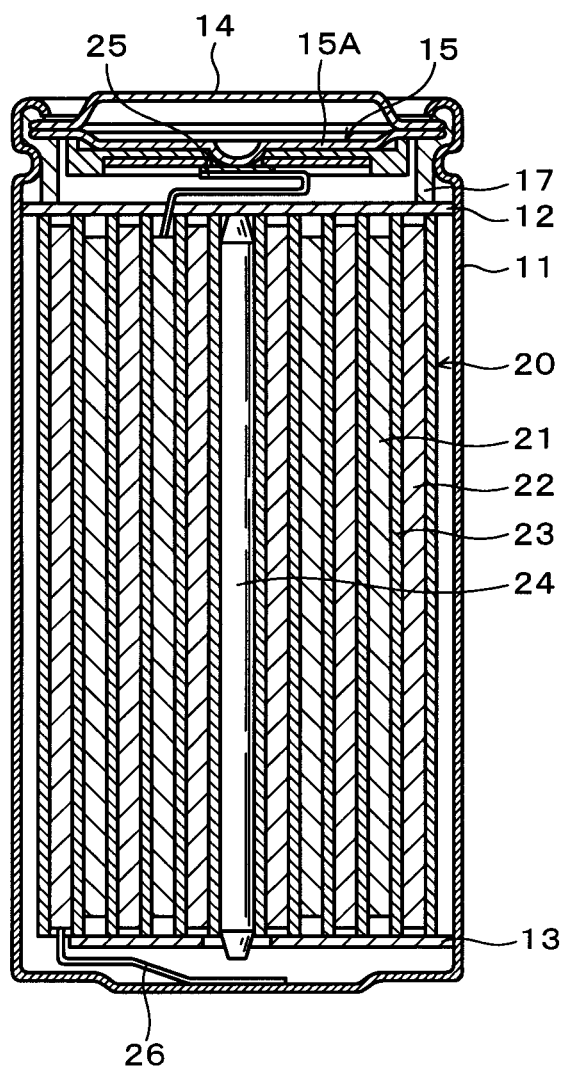
FIG. 1 is a cross-sectional view showing a structure of a battery according to an embodiment.

FIG. 1 shows a cross section structure of the nonaqueous electrolyte secondary battery according to an embodiment. The nonaqueous electrolyte secondary battery is a so-called lithium-ion secondary battery in which the capacity of the anode is represented by a capacity component determined by occlusion and release of lithium (Li) which is an electrode reaction substance. The nonaqueous electrolyte secondary battery is a secondary battery capable of discharging at high rates in which the ratio of the discharge capacity B during discharging at a 5 C rate to the discharge capacity A during discharging at a 0.2 C rate ((B/A)×100) is 80% or more. Therefore, the nonaqueous electrolyte secondary battery is suitable as a secondary battery for electrical vehicles and power tools which need high-rate discharging.

This nonaqueous electrolyte secondary battery is a so-called cylindrical shape and includes a spiral electrode body 20 in which a band-like cathode 21 and a band-like anode 22 are stacked and wound via a separator 23 in a substantially hollow cylinder-like battery can 11. The battery can 11 is made of iron (Fe) plated with nickel (Ni) and one end thereof is closed, and the other end is opened. An electrolytic solution is injected into the battery can 11 and the separator 23 is impregnated with the electrolytic solution. Further, a pair of insulating plates 12 and 13 are arranged to sandwich the spiral electrode body 20 perpendicularly to a periphery surface thereof.

A battery lib 14 and a safety valve mechanism 15 that is positioned inside the battery lib 14 are mounted in the open end of the battery can 11 by caulking via a gasket 17 to seal the inside of the battery can 11. The battery lib 14 is made of the same material as that of the battery can 11, for example. The safety valve mechanism 15 is electrically connected to the battery lib 14. When an internal pressure of the battery becomes more than certain value due to internal short circuit or heating from outside, a disk plate 15A is inverted to cut the electric connection between the battery lib 14 and the spiral electrode body 20. The gasket 17 is made of, for example, an insulating material and asphalt is applied to the surface thereof.

The spiral electrode body 20 is wound centering on a center pin 24. A cathode lead 25 containing aluminum (Al) or the like is connected to the cathode 21 of the spiral electrode body 20, and an anode lead 26 containing nickel or the like is connected to the anode 22. The cathode lead 25 is welded to the safety valve mechanism 15 to be electrically connected with the battery lib 14. The anode lead 26 is welded to the battery can 11 to be electrically connected.

Figure 2:
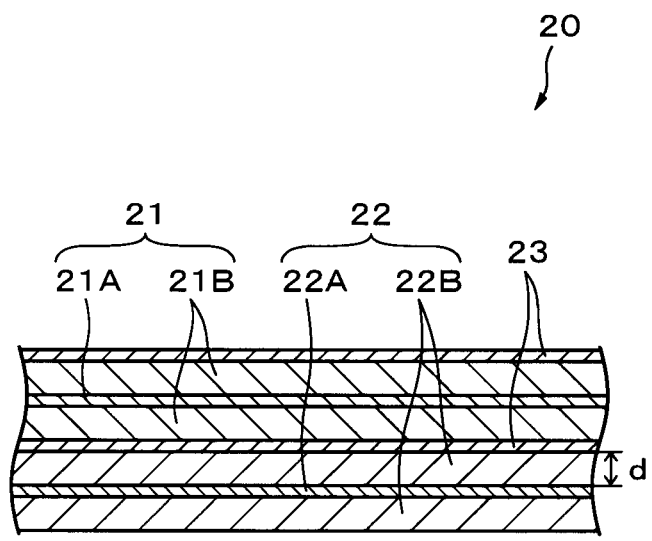
FIG. 2 is a partly enlarged cross-sectional view showing a spiral electrode body in the battery shown in FIG. 1.

FIG. 2 is a partially enlarged view of the spiral electrode body 20 shown in FIG. 1. Hereinafter, the cathode 21, the anode 22, the separator 23, and the electrolytic solution which constitute the secondary battery will be sequentially described with reference to FIG. 2.
(Cathode)

The cathode 21 has a structure in which the cathode active material layer 21B is formed on both sides of the cathode current collector 21A that has a pair of opposed surfaces. The cathode current collector 21A is made of metal foil such as aluminum foil. The cathode active material layer 21B include, for example, two or more cathode materials capable of occluding and releasing lithium as a cathode active material and further include a conductive agent such as graphite and a binder such as polyvinylidene fluoride, if necessary.

Preferable examples of the cathode material capable of occluding and releasing lithium include lithium containing compounds such as lithium oxide, lithium phosphorus oxide, lithium sulfide, or intercalation compounds including lithium. This is because a high voltage and a high energy density are obtained by using some of lithium containing compounds. Examples of the lithium containing compound include, for example, composite oxides containing lithium and transition metal elements or phosphoric acid compounds including lithium and the transition metal element. Particularly, compounds containing at least one of cobalt (Co), nickel (Ni), and manganese (Mn) are preferable. This is because higher voltages can be obtained. The chemical formula is represented, for example, by $Li_xMIO_2$ or $Li_yMIIPO_4$, wherein, MI and MII represent one or more transition metal elements. Values of x and y vary depending on the state of charge and discharge of the batteries. Usually, they are $0.05 \leq x \leq 1.10$ and $0.05 \leq y \leq 1.10$.

Specific examples of the composite oxide containing lithium and transition metal elements include a lithium cobalt composite oxide ($Li_xCoO_2$), a lithium nickel complex oxide ($Li_xNiO_2$), a lithium nickel cobalt composite oxide ($Li_xNi_{1-z}Co_zO_2$ (z<1)), a lithium nickel cobalt manganese composite oxide ($Li_xNi_{(1-v-w)}Co_vMn_wO_2$ (v+w<1)), or a lithium manganese composite oxide having a spinel-type structure ($LiMn_2O_4$). Specific examples of the phosphoric acid compound including lithium and transition metal elements include a lithium-iron phosphoric acid compound ($LiFePO_4$) or a lithium-iron manganese phosphoric acid compound ($LiFe_{1-u}Mn_uPO_4$ (u<1)).

Recently, vehicles such as electrical vehicles and hybrid vehicles have been attracting attention from an environmental point of view. The lithium-ion secondary battery that is lightweight and capable of obtaining a high energy density has been drawing attention as the battery for these vehicles. Batteries for vehicles are large and the lithium cobalt composite oxide ($Li_xCoO_2$) is currently employed as the cathode active material. Thus, it is necessary to use cobalt (Co) which is a rare metal in large amounts. As for recoverable reserves in the world of typical metals used for the cathode, the total of iron (Fe) is 232 billion tons, the total of manganese (Mn) is 5 billion tons, the total of nickel (Ni) is 120 million tons, and the total of cobalt (Co) is 10 million tons. These numerical values show that there is little cobalt (Co). Therefore, when cobalt (Co) is used for the cathode, production costs are higher, which is a problem from a practical application standpoint. Thus, the cost-focused development is desired. From the viewpoint of the cost, it is preferable to use a lithium transition metal composite oxide containing at least one of nickel, manganese, and iron as the cathode active material. Specifically, it is preferable to use at least one of the lithium nickel complex oxide ($Li_xNiO_2$), the lithium nickel cobalt composite oxide ($Li_xNi_{1-z}Co_zO_2$ (z<1)), the lithium nickel cobalt manganese composite oxide ($Li_xNi_{(1-v-w)}Co_vMn_wO_2$ (v+w<1)), the lithium manganese composite oxide ($LiMn_2O_4$), the lithium-iron phosphoric acid compound ($LiFePO_4$), and the lithium-iron manganese phosphoric acid compound ($LiFe_{1-u}Mn_uPO_4$ (u<1)).
(Anode)

For example, as with the cathode 21, the anode 22 has a structure in which an anode active material layer 22B is provided on both faces of an anode current collector 22A having a pair of opposite faces. The anode current collector 22A is made of metal foil such as copper (Cu) foil. The anode active material layer 22B include any one, or two or more of the anode material capable of occluding and releasing lithium as an anode active material, for example, and may also include conductive agents and binders, if necessary.

Examples of the anode material capable of occluding and releasing lithium include carbon materials such as graphite, non-graphitizable carbon, or graphitizable carbon. Any one of the carbon materials may be used alone or two or more of them may be used in combination. Further, two or more of carbon materials with different mean particle diameters may be mixed.

Further, example of the cathode material capable of occluding and releasing lithium include materials which include a metal element capable of forming lithium and alloy or a metalloid element as a constituting element. Specific examples include the simple substance, alloy, or compound of the metal element capable of forming lithium and alloy; or the simple substance, alloy, or compound of the metalloid element capable of forming lithium and alloy; or materials having the phases of one or more such materials in at least one part thereof.

Examples of the metal element or metalloid element include tin (Sn), lead (Pb), aluminium (Al), indium (In), silicon (Si), zinc (Zn), antimony (Sb), bismuth (Bi), cadmium (Cd), magnesium (Mg), boron (B), gallium (Ga), germanium (Ge), arsenic (As), silver (Ag), zirconium (Zr), yttrium (Y), or hafnium (Hf). Among them, metal elements of Group 14 of the long-period periodic table or metalloid elements are preferable. A particularly preferable example is silicon (Si) or tin (Sn). This is because silicon (Si) and tin (Sn) have a large ability to occlude and release lithium and a high energy density can be obtained.

Examples of the alloy of silicon (Si) include alloys containing at least one among the group including tin (Sn), nickel (Ni), copper (Cu), iron (Fe), cobalt (Co), manganese (Mn), zinc (Zn), indium (In), silver (Ag), titanium (Ti), germanium (Ge), bismuth (Bi), antimony (Sb), and chromium (Cr) as the second constituting element other than silicon (Si). Examples of the alloy of tin (Sn) include alloys containing at least one among the group including silicon (Si), nickel (Ni), copper (Cu), iron (Fe), cobalt (Co), manganese (Mn), zinc (Zn), indium (In), silver (Ag), titanium (Ti), germanium (Ge), bismuth (Bi), antimony (Sb), and chromium (Cr) as the second constituting element other than tin (Sn).

As a compound of silicon (Si) or a compound of tin (Sn), for example, a compound including oxygen (O) or carbon (C) is listed. In addition to silicon (Si) or tin (Sn), the second constituting element described above may be included.

The thickness d of the anode active material layer 22B after the charging is preferably 75 μm or less, more preferably 69 μm or less. This is because the electrode area is increased and the current density is decreased when the thickness d of the anode active material layer 22B is reduced, thereby permitting excellent large current discharging characteristics to be obtained.

(Separator)

The separator 23 isolates the cathode 21 and the anode 22 and allows lithium ions to pass therethrough while preventing short circuit of electric currents by contact of the cathode 21 and the anode 22. As the separator 23, for example, a porous film made of synthetic resins such as polytetrafluoroethylene, polypropylene, polyethylene, and aramid or a ceramic porous film may be used and two or more of the porous films may be stacked for use. Further, the separator 23 may be formed by mixing two or more materials.

(Electrolytic Solution)

The electrolytic solution impregnated with the separator 23 includes, for example, a solvent and an electrolyte salt dissolved in the solvent. Examples of the solvent include nonaqueous solvents such as carbonates. The nonaqueous solvent is classified as a high boiling point solvent whose boiling point is higher than 150° C. in atmospheric pressure ($1.01325 \times 10^5$ Pa) or a low boiling point solvent whose boiling point is lower than 150° C. in atmospheric pressure. When these solvents are mixed for use, a high ion conductivity can be obtained, and thus it is preferable.

Examples of the high boiling point solvent include cyclic carbonates such as ethylene carbonate, propylene carbonate, butylene carbonate, vinylene carbonate, and vinyl ethylene carbonate; lactones such as γ-butyrolactone or γ-valerolactone; lactam such as 2-methyl-1-pyrrolidone; cyclic carbamate such as 3-methyl-2-oxazolidinone; or cyclic sulfone such as tetramethylen sulfone. Examples of the low boiling point solvent include chain carbonates such as diethyl carbonate, dimethyl carbonate, ethyl methyl carbonate, or methylpropyl carbonate; chain carboxylates such as methyl acetate, ethyl acetate, methyl propionate, ethyl propionate, methyl isobutyrate, or methyl trimethylacetate; ketone such as pinacolin; ethers such as 1,2-dimethoxyethane, tetrahydrofuran, tetrahydropyran, 1,3-dioxolane, 1,3-dioxane, or 1,4-dioxane; chain amides such as N,N-dimethylformamide and N,N-dimethylacetamide; or chain carbamates such as N,N-dimethylmethyl carbamate and N,N-diethylmethyl carbamate. Any one of the solvents may be used alone or two or more of them may be used in combination.

The solvent includes at least one of fluoro ethylene carbonate represented by Chemical Formula (1) described below and difluoro ethylene carbonate represented by Chemical Formula (2) described below as the high boiling point solvent. Preferably, it includes both fluoro ethylene carbonate represented by Chemical Formula (1) described below and difluoro ethylene carbonate represented by Chemical Formula (2) described below. The battery temperature rise at the time of external short circuit can be suppressed by using at least one of fluoro ethylene carbonate and difluoro ethylene carbonate. The battery temperature rise at the time of external short circuit can be suppressed by using both fluoro ethylene carbonate and difluoro ethylene carbonate. This is estimated to be due to the fact that a stable coating film is formed on the surface of the cathode 21 and/or the anode 22 by allowing the electrolytic solution to contain at least one of fluoro ethylene carbonate and difluoro ethylene carbonate even at high temperatures and decomposition reaction of the surface of the cathode 21 and/or the anode 22 with the electrolytic solution is controlled.

[Chemical Formula 3]

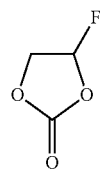

(1)

[Chemical Formula 4]

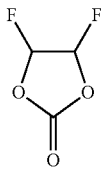

(2)

The content of at least one of fluoro ethylene carbonate and difluoro ethylene carbonate is preferably 1% by mass or more and 80% by mass or less based on the solvent, more preferably 3% by mass or more and 60% by mass or less. The effect of suppressing the rise of the battery temperature at the time of external short circuit tends to be reduced when the content is less than 1 mass %, while large current discharging characteristics tend to be reduced when the content exceeds 80% by mass.

Any electrolyte salt can be used as long as it is used for the type of battery. Examples thereof include $LiPF_6$, $LiBF_4$, $LiN(CF_3SO_2)_2$, $LiN(C_2F_5SO_2)_2$, $LiClO_4$, $LiAsF_6$, $LiB(C_2O_4)_2$, and $LiBC_2O_4F_2$. The lithium present in a battery system is not necessarily supplied from the cathode 21 or the anode 22. The cathode 21 or the anode 22 may be electrochemically doped with the lithium in the manufacturing process of the electrodes or batteries.

(Method for Manufacturing Secondary Battery)

For example, the nonaqueous electrolyte secondary battery having the above-described structure can be produced as follows.

First, the cathode active material layer 21B is formed on, for example, both sides of the cathode current collector 21A and the cathode 21 is produced. As for the cathode active material layer 21B, the powder of the cathode active material, the conductive agent, and the binder are mixed to prepare a cathode mixture and then the cathode mixture is dispersed in a solvent such as N-methyl-2-pyrrolidone to provide a paste-like cathode mixture slurry. The cathode mixture slurry is applied to both sides of the cathode current collector 21A, which is dried and subjected to compression molding to form the cathode active material layer 21B.

Next, the anode active material layer 22B is formed on, for example, both sides of the anode current collector 22A and the anode 22 is produced. As for the anode active material layer 22B, for example, the powder of the anode active material and the binder are mixed to prepare an anode mixture and then the anode mixture is dispersed in a solvent such as N-methyl-2-pyrrolidone to provide a paste-like anode mixture slurry. The anode mixture slurry is applied to both sides of the anode current collector 22A, which is dried and subjected to compression molding to form the anode active material layer 22B. The thickness d of the anode active material layer 22B is preferably 65 µm or less, more preferably 60 µm or less. This is because the electrode area is increased and the current density is decreased when the thickness d of the anode active material layer 22B is reduced, thereby permitting excellent large current discharging characteristics to be obtained.

Next, the cathode lead 25 is fixed to the cathode current collector 21A with welding or the like, and the anode lead 26 is fixed to the anode current collector 22A with welding or the like. Then, the cathode 21 and the anode 22 are wound sandwiching the separator 23 therebetween, a tip portion of the cathode lead 25 is welded to the safety valve mechanism 15, a tip portion of the anode lead 26 is welded to the battery can 11, and the wound cathode 21 and anode 22 are sandwiched between a pair of the insulating plates 12 and 13, and then housed inside the battery can 11. After housing the cathode 21 and anode 22 inside the battery can 11, the electrolytic solution is injected into the battery can 11 to be impregnated into the separator 23. Thereafter, the battery lib 14 and the safety valve mechanism 15 are caulked and fixed to an opening end of the battery can 11 through the gasket 17. As a result, the nonaqueous electrolyte secondary battery shown in FIGS. 1 and 2 is fabricated.

When this nonaqueous electrolyte secondary battery is charged, a lithium ion is released from, for example, the cathode active material layer 21B and occluded into the anode active material layer 22B via the electrolytic solution. When the nonaqueous electrolyte secondary battery is discharged, a lithium ion is released from, for example, the anode active material layer 22B and occluded into the cathode active material layer 21B via the electrolytic solution.

As described above, according to the embodiment, at least one of fluoro ethylene carbonate and difluoro ethylene carbonate is included in the electrolytic solution and the temperature rise at the time of external short circuit can be suppressed even when the PTC element is not used. The suppressive effect is estimated to be due to the formation of a stable coating film on the surface of the cathode 21 and/or the anode 22 by adding at least one of fluoro ethylene carbonate and difluoro ethylene carbonate. Thus, the balance between high-power characteristics and safety can be achieved.

When the lithium transition metal composite oxide containing at least one of nickel, manganese, and iron is used as the cathode active material, a high-power, high-safety, and low-cost nonaqueous electrolyte secondary battery can be provided.

EXAMPLES

Hereinafter, specific examples of the present application will be described with reference to examples according to an embodiment. However, the present application is not to be construed as being limited to these examples.

Example 1-1

The nonaqueous electrolyte secondary battery with a cylindrical shape shown in FIGS. 1 and 2 was fabricated in the following manner.

The cathode 21 was produced as follows. First, a mixture of 45% by mass of powder of $LiNi_{0.8}Co_{0.2}AlO_2$ having an average particle diameter of 20 µm, 10% by mass of powder of $LiNi_{0.34}Co_{0.33}Mn_{0.33}O_2$ having an average particle diameter of 10 µm, and 45% by mass of powder of $LiMn_2O_4$ having an average particle diameter of 20 µm was used as the cathode active material. 91% by mass of the mixture, 6% by mass of artificial graphite as a conductive agent (KS-15, manufactured by LONZA Japan), and 3% by mass of polyvinylidene fluoride as a binder were mixed, which was then dispersed in N-methyl-2-pyrrolidone as a solvent, thereby obtaining a cathode mixture slurry. Subsequently, the cathode mixture slurry was uniformly applied over both faces of the cathode current collector 21A having a thickness of 20 µm and dried, which was then compression-molded, thereby forming the cathode active material layer 21B and fabricating the cathode 21. Thereafter, the cathode lead 25 made of aluminum was attached to one end of the cathode current collector 21A using a resistance welding machine.

The anode 22 was produced as follows. First, 94% by mass of graphite powder (manufactured by Osaka Gas Chemicals Co., Ltd.) as the anode active material, 1% by mass of Vapor Grown Carbon Fiber (VGCF, manufactured by Showa Denko K.K.) as the conductive agent, and 5% by mass of polyvinylidene fluoride as the binder were mixed, which was then dispersed in N-methyl-2-pyrrolidone as the solvent. The resulting product was uniformly applied over both faces of the anode current collector 22A having a thickness of 20 μm and dried, which was then compression-molded, thereby forming the anode active material layer 22B to produce the anode 22. Subsequently, the thickness d of the anode active material layer 22B was measured with a dial gage. As a result, the thickness d of the anode active material layer 22B was 50 μm. Thereafter, the anode lead 26 made of nickel was attached to one end of the anode current collector 22A using the resistance welding machine.

The cathode 21 and the anode 22 were respectively produced and then the separators 23 made of polyethylene having a thickness of 20 μm was prepared. The anode 22, the separator 23, the cathode 21, and the separator 23 were stacked in this order. The stacked product was spirally wound many times, the winding end portion was fixed using an adhesive tape, and the spiral electrode body 20 was produced.

After producing the spiral electrode body 20, the spiral electrode body 20 was sandwiched between a pair of the insulating plates 12 and 13. The anode lead 26 was welded to the battery can 11 and the cathode lead 25 was welded to the safety valve mechanism 15. Then, the spiral electrode body 20 was housed in the battery can 11 made of iron plated with nickel. Thereafter, the electrolytic solution was injected into the battery can 11 under reduced pressure and the nonaqueous electrolyte secondary battery with a cylindrical shape, a diameter of 18 mm, and a height of 65 mm was produced.

10% by mass of fluoro ethylene carbonate represented by Chemical Formula (1), 30% by mass of ethylene carbonate, and 60% by mass of dimethyl carbonate were mixed and prepared, which was used as a solvent of the electrolytic solution. Lithium hexafluorophosphate (1 mol/l) was used as the electrolyte salt of the electrolytic solution.

Example 1-2

The nonaqueous electrolyte secondary battery was produced in the same manner as described in Example 1-1 except that 40% by mass of fluoro ethylene carbonate represented by Chemical Formula (1), 5% by mass of ethylene carbonate, and 55% by mass of dimethyl carbonate were mixed and prepared, which was used as the solvent of the electrolytic solution.

Example 1-3

The nonaqueous electrolyte secondary battery was produced in the same manner as described in Example 1-1 except that 60% by mass of fluoro ethylene carbonate represented by Chemical Formula (1), 5% by mass of ethylene carbonate, and 35% by mass of dimethyl carbonate were mixed and prepared, which was used as the solvent of the electrolytic solution.

Example 1-4

The nonaqueous electrolyte secondary battery was produced in the same manner as described in Example 1-1 except that 80% by mass of fluoro ethylene carbonate represented by Chemical Formula (1), 5% by mass of ethylene carbonate, and 15% by mass of dimethyl carbonate were mixed and prepared, which was used as the solvent of the electrolytic solution.

Example 1-5

The nonaqueous electrolyte secondary battery was produced in the same manner as described in Example 1-1 except that 5% by mass of fluoro ethylene carbonate represented by Chemical Formula (1), 35% by mass of ethylene carbonate, and 60% by mass of dimethyl carbonate were mixed and prepared, which was used as the solvent of the electrolytic solution.

Example 1-6

The nonaqueous electrolyte secondary battery was produced in the same manner as described in Example 1-1 except that 3% by mass of fluoro ethylene carbonate represented by Chemical Formula (1), 37% by mass of ethylene carbonate, and 60% by mass of dimethyl carbonate were mixed and prepared, which was used as the solvent of the electrolytic solution.

Example 1-7

The nonaqueous electrolyte secondary battery was produced in the same manner as described in Example 1-1 except that 1% by mass of fluoro ethylene carbonate represented by Chemical Formula (1), 39% by mass of ethylene carbonate, and 60% by mass of dimethyl carbonate were mixed and prepared, which was used as the solvent of the electrolytic solution.

(Comparison 1-1)

The nonaqueous electrolyte secondary battery was produced in the same manner as described in Example 1-1 except that 40% by mass of ethylene carbonate and 60% by mass of dimethyl carbonate were mixed and prepared, which was used as the solvent of the electrolytic solution.

Example 1-8

The nonaqueous electrolyte secondary battery was produced in the same manner as described in Example 1-1 except that 0.5% by mass of fluoro ethylene carbonate represented by Chemical Formula (1), 39.5% by mass of ethylene carbonate, and 60% by mass of dimethyl carbonate were mixed and prepared, which was used as the solvent of the electrolytic solution.

(Comparison 1-2)

The nonaqueous electrolyte secondary battery was produced in the same manner as described in Example 1-1 except that a solvent containing 100% by mass of fluoro ethylene carbonate represented by Chemical Formula (1) was used as the solvent of the electrolytic solution.

Example 1-9

The nonaqueous electrolyte secondary battery was produced in the same manner as described in Example 1-1 except that the PTC element was provided between the safety valve mechanism 15 and the battery lib 16 in the assembly process of the nonaqueous electrolyte secondary battery.

(Comparison 1-3)

The nonaqueous electrolyte secondary battery was produced in the same manner as described in Example 1-9 except that 40% by mass of ethylene carbonate and 60% by mass of dimethyl carbonate were mixed and prepared, which was used as the solvent of the electrolytic solution.

Example 2-1

The nonaqueous electrolyte secondary battery was produced in the same manner as described in Example 1-1 except that 100% by mass of powder of $LiNi_{0.8}Co_{0.2}AlO_2$ having an average particle diameter of 20 µm was used as the cathode active material.

Example 2-2

The nonaqueous electrolyte secondary battery was produced in the same manner as described in Example 1-1 except that 100% by mass of powder of $LiNi_{0.34}Co_{0.33}Mn_{0.33}O_2$ having an average particle diameter of 10 µm was used as the cathode active material.

Example 2-3

The nonaqueous electrolyte secondary battery was produced in the same manner as described in Example 1-1 except that 100% by mass of powder of $LiMn_2O_4$ having an average particle diameter of 20 µm was used as the cathode active material.

Example 2-4

The nonaqueous electrolyte secondary battery was produced in the same manner as described in Example 1-1 except that 100% by mass of powder of $LiFePO_4$ having an average particle diameter of 0.8 µm was used as the cathode active material.

Example 2-5

The nonaqueous electrolyte secondary battery was produced in the same manner as described in Example 1-1 except that 100% by mass of powder of $LiCoO_2$ having an average particle diameter of 10 µm was used as the cathode active material.

Example 3-1

The nonaqueous electrolyte secondary battery was produced in the same manner as described in Example 1-1 except that the thickness d of the anode active material layer 22B was set to 35 µm before assembly of the battery.

Example 3-2

The nonaqueous electrolyte secondary battery was produced in the same manner as described in Example 1-1 except that the thickness d of the anode active material layer 22B was set to 20 µm before assembly of the battery.

Example 3-3

The nonaqueous electrolyte secondary battery was produced in the same manner as described in Example 1-1 except that the thickness d of the anode active material layer 22B was set to 55 µm before assembly of the battery.

Example 3-4

The nonaqueous electrolyte secondary battery was produced in the same manner as described in Example 1-1 except that the thickness d of the anode active material layer 22B was set to 60 µm before assembly of the battery.

Example 3-5

The nonaqueous electrolyte secondary battery was produced in the same manner as described in Example 1-1 except that the thickness d of the anode active material layer 22B was set to 65 µm before assembly of the battery.

(Comparison 3-1)

The nonaqueous electrolyte secondary battery was produced in the same manner as described in Example 1-1 except that the thickness d of the anode active material layer 22B was set to 80 µm before assembly of the battery.

(Comparison 3-2)

The nonaqueous electrolyte secondary battery was produced in the same manner as described in Example 1-1 except that the thickness d of the anode active material layer 22B was set to 70 µm before assembly of the battery.

(Comparison 3-3)

The nonaqueous electrolyte secondary battery was produced in the same manner as described in Example 3-2 except that 40% by mass of ethylene carbonate and 60% by mass of dimethyl carbonate were mixed and prepared, which was used as the solvent of the electrolytic solution.

(Comparison 4-1)

The nonaqueous electrolyte secondary battery was produced in the same manner as described in Example 1-1 except that 10% by mass of tetrafluoro ethylene carbonate (TFEC) represented by Chemical Formula (3) was used as the solvent of the electrolytic solution in place of 10% by mass of fluoro ethylene carbonate represented by Chemical Formula (1).

[Chemical Formula 5]

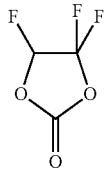

(3)

(Comparison 4-2)

The nonaqueous electrolyte secondary battery was produced in the same manner as described in Example 1-1 except that 10% by mass of perfluoroethylene carbonate (PFEC) represented by Chemical Formula (4) was used as the solvent of the electrolytic solution in place of 10% by mass of fluoro ethylene carbonate represented by Chemical Formula (1).

[Chemical Formula 6]

(4)

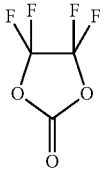

(Comparison 4-3)

The nonaqueous electrolyte secondary battery was produced in the same manner as described in Example 1-1 except that 10% by mass of tetrafluoro propylene carbonate (TFPC) represented by Chemical Formula (5) was used as the solvent of the electrolytic solution in place of 10% by mass of fluoro ethylene carbonate represented by Chemical Formula (1).

[Chemical Formula 7]

(5)

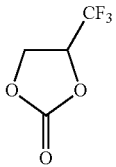

(Comparison 4-4)

The nonaqueous electrolyte secondary battery was produced in the same manner as described in Example 1-1 except that 10% by mass of fluoro vinylene carbonate (FVC) represented by Chemical Formula (6) was used as the solvent of the electrolytic solution in place of 10% by mass of fluoro ethylene carbonate represented by Chemical Formula (1).

[Chemical Formula 8]

(6)

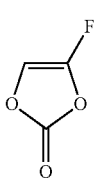

(Comparison 4-5)

The nonaqueous electrolyte secondary battery was produced in the same manner as described in Example 1-1 except that 10% by mass of chloroethylene carbonate (ClEC) represented by Chemical Formula (7) was used as the solvent of the electrolytic solution in place of 10% by mass of fluoro ethylene carbonate represented by Chemical Formula (1).

[Chemical Formula 9]

(7)

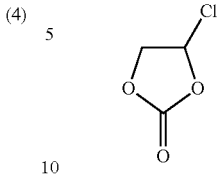

(Comparison 4-6)

The nonaqueous electrolyte secondary battery was produced in the same manner as described in Example 1-1 except that 10% by mass of bromo ethylene carbonate (BrEC) represented by Chemical Formula (8) was used as the solvent of the electrolytic solution in place of 10% by mass of fluoro ethylene carbonate represented by Chemical Formula (1).

[Chemical Formula 10]

(8)

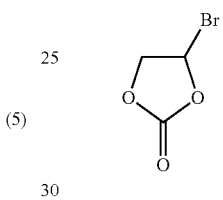

(Comparison 4-7)

The nonaqueous electrolyte secondary battery was produced in the same manner as described in Example 1-1 except that 10% by mass of iodinated ethylene carbonate (IEC) represented by Chemical Formula (9) was used as the solvent of the electrolytic solution in place of 10% by mass of fluoro ethylene carbonate represented by Chemical Formula (1).

[Chemical Formula 11]

(9)

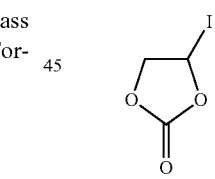

Example 5-1

The nonaqueous electrolyte secondary battery was produced in the same manner as described in Example 1-1 except that 5% by mass of fluoro ethylene carbonate represented by Chemical Formula (1), 5% by mass of difluoro ethylene carbonate represented by Chemical Formula (2), 30% by mass of ethylene carbonate, and 60% by mass of dimethyl carbonate were mixed and prepared, which was used as the solvent of the electrolytic solution.

Example 6-1

The nonaqueous electrolyte secondary battery was produced in the same manner as described in Example 1-1 except that 10% by mass of difluoro ethylene carbonate represented by Chemical Formula (2) was used as the solvent of the electrolytic solution in place of 10% by mass of fluoro ethylene carbonate represented by Chemical Formula (1).

Example 6-2

The nonaqueous electrolyte secondary battery was produced in the same manner as described in Example 1-2 except that 40% by mass of difluoro ethylene carbonate represented by Chemical Formula (2) was used as the solvent of the electrolytic solution in place of 40% by mass of fluoro ethylene carbonate represented by Chemical Formula (1).

Example 6-3

The nonaqueous electrolyte secondary battery was produced in the same manner as described in Example 1-3 except that 60% by mass of difluoro ethylene carbonate represented by Chemical Formula (2) was used as the solvent of the electrolytic solution in place of 60% by mass of fluoro ethylene carbonate represented by Chemical Formula (1).

Example 6-4

The nonaqueous electrolyte secondary battery was produced in the same manner as described in Example 1-4 except that 80% by mass of difluoro ethylene carbonate represented by Chemical Formula (2) was used as the solvent of the electrolytic solution in place of 80% by mass of fluoro ethylene carbonate represented by Chemical Formula (1).

Example 6-5

The nonaqueous electrolyte secondary battery was produced in the same manner as described in Example 1-5 except that 5% by mass of difluoro ethylene carbonate represented by Chemical Formula (2) was used as the solvent of the electrolytic solution in place of 5% by mass of fluoro ethylene carbonate represented by Chemical Formula (1).

Example 6-6

The nonaqueous electrolyte secondary battery was produced in the same manner as described in Example 1-6 except that 3% by mass of difluoro ethylene carbonate represented by Chemical Formula (2) was used as the solvent of the electrolytic solution in place of 3% by mass of fluoro ethylene carbonate represented by Chemical Formula (1).

Example 6-7

The nonaqueous electrolyte secondary battery was produced in the same manner as described in Example 1-7 except that 1% by mass of difluoro ethylene carbonate represented by Chemical Formula (2) was used as the solvent of the electrolytic solution in place of 1% by mass of fluoro ethylene carbonate represented by Chemical Formula (1).

Example 6-8

The nonaqueous electrolyte secondary battery was produced in the same manner as described in Example 1-8 except that 0.5% by mass of difluoro ethylene carbonate represented by Chemical Formula (2) was used as the solvent of the electrolytic solution in place of 0.5% by mass of fluoro ethylene carbonate represented by Chemical Formula (1).

(Comparison 6-1)

The nonaqueous electrolyte secondary battery was produced in the same manner as described in Comparison 1-2 except that 100% by mass of difluoro ethylene carbonate represented by Chemical Formula (2) was used as the solvent of the electrolytic solution in place of 100% by mass of fluoro ethylene carbonate represented by Chemical Formula (1).

The nonaqueous electrolyte secondary batteries thus produced in Examples and Comparisons were evaluated as follows.

[Evaluation of Anode Thickness After Charging]

With reference to the nonaqueous electrolyte secondary batteries thus produced in Examples and Comparisons, the charging was performed at 25° C. at a constant current of 2 C under a constant voltage condition (up to the upper limit of 4.2V). Then, the nonaqueous electrolyte secondary batteries were disassembled and the thickness d of the anode active material layer 22B was measured with the dial gage. In this regard, the term "1 C" means a current value when the rated capacity of the battery is discharged with constant current for 1 hour and the term "2 C" means a current value when the rated capacity of the battery is discharged with constant current for 0.5 hour.

[Evaluation of Large Current Discharging Characteristics]

With reference to the nonaqueous electrolyte secondary batteries thus produced in Examples and Comparisons, the charging was performed at 25° C. at a constant current of 2 C under a constant voltage condition (up to the upper limit of 4.2V), followed by discharging at a constant current of 0.2 C (up to a voltage of 3V). Then, the charging was performed at a constant current of 2 C under a constant voltage condition (up to the upper limit of 4.2V), followed by discharging at a constant current of 5 C (up to a voltage of 3V). Then, large current discharging characteristics were determined by the following equation. In this regard, the term "0.2 C" means a current value when the rated capacity of the battery is discharged with constant current for 5 hours and the term "5 C" means a current value when the rated capacity of the battery is discharged with constant current for 0.2 hour.

Large current discharging characteristic (5 C/0.2 C)=
[(capacity of battery during discharging at a 5 C rate [mAh])/(capacity of battery during discharging at a 0.2 C rate [mAh])]×100(%)

[Evaluation of the Highest Temperature at the Time of External Short Circuit After 1 Cycle]

As for the nonaqueous electrolyte secondary batteries thus produced in Examples and Comparisons, the charging was respectively performed at 25° C. at a constant current of 2 C under a constant voltage condition (up to the upper limit of 4.2V), followed by performing external short circuit test (short test) at 25° C. At that time, the highest temperature of the exterior portions of the batteries was measured.

[Evaluation of the Highest Temperature at the Time of External Short Circuit After 300 Cycles]

As for the nonaqueous electrolyte secondary batteries thus produced in Examples and Comparisons, the charging was respectively performed at 25° C. at a constant current of 2 C under a constant voltage condition (up to the upper limit of 4.2V) and then the discharging was performed at a constant current of 1 C (up to a voltage of 3V). 300 cycles of the charging and discharging were carried out. Next, the charging was performed at a constant current of 2 C under a constant voltage condition (up to the upper limit of 4.2V), followed by performing external short circuit test (short test) at 25° C. At that time, the highest temperature of the exterior portions of the batteries was measured.

Structures of the nonaqueous electrolyte secondary batteries of Examples and Comparisons are shown in Table 1. Evaluation results as to the nonaqueous electrolyte secondary batteries of Examples and Comparisons are shown in Table 2.

TABLE 1

| | | ELECTROLYTIC SOLUTION | | CATHODE | | | | |
|---|---|---|---|---|---|---|---|---|
| | WHETHER PTC IS USED | ADDITIVE AGENTS USED | CONTENT OF ADDITIVE AGENTS [% BY MASS] | $LiNi_{0.8}Co_{0.2}AlO_2$ [% BY MASS] | $LiNi_{0.34}Co_{0.33}Mn_{0.33}O_2$ [% BY MASS] | $LiCoO_2$ [% BY MASS] | $LiMn_2O_4$ [% BY MASS] | $LiFePO_4$ [% BY MASS] |
| EXAMPLE 1-1 | NOT USED | FEC | 10 | 45 | 10 | 0 | 45 | 0 |
| EXAMPLE 1-2 | NOT USED | FEC | 40 | 45 | 10 | 0 | 45 | 0 |
| EXAMPLE 1-3 | NOT USED | FEC | 60 | 45 | 10 | 0 | 45 | 0 |
| EXAMPLE 1-4 | NOT USED | FEC | 80 | 45 | 10 | 0 | 45 | 0 |
| EXAMPLE 1-5 | NOT USED | FEC | 5 | 45 | 10 | 0 | 45 | 0 |
| EXAMPLE 1-6 | NOT USED | FEC | 3 | 45 | 10 | 0 | 45 | 0 |
| EXAMPLE 1-7 | NOT USED | FEC | 1 | 45 | 10 | 0 | 45 | 0 |
| COMPARISON 1-1 | NOT USED | — | 0 | 45 | 10 | 0 | 45 | 0 |
| EXAMPLE 1-8 | NOT USED | FEC | 0.5 | 45 | 10 | 0 | 45 | 0 |
| COMPARISON 1-2 | NOT USED | FEC | 100 | 45 | 10 | 0 | 45 | 0 |
| EXAMPLE 1-9 | USED | FEC | 10 | 45 | 10 | 0 | 45 | 0 |
| COMPARISON 1-3 | USED | — | 0 | 45 | 10 | 0 | 45 | 0 |
| EXAMPLE 2-1 | NOT USED | FEC | 10 | 100 | 0 | 0 | 0 | 0 |
| EXAMPLE 2-2 | NOT USED | FEC | 10 | 0 | 100 | 0 | 0 | 0 |
| EXAMPLE 2-3 | NOT USED | FEC | 10 | 0 | 0 | 0 | 100 | 0 |
| EXAMPLE 2-4 | NOT USED | FEC | 10 | 0 | 0 | 0 | 0 | 100 |
| EXAMPLE 2-5 | NOT USED | FEC | 10 | 0 | 0 | 100 | 0 | 0 |
| EXAMPLE 3-1 | NOT USED | FEC | 10 | 45 | 10 | 0 | 45 | 0 |
| EXAMPLE 3-2 | NOT USED | FEC | 10 | 45 | 10 | 0 | 45 | 0 |
| EXAMPLE 3-3 | NOT USED | FEC | 10 | 45 | 10 | 0 | 45 | 0 |
| EXAMPLE 3-4 | NOT USED | FEC | 10 | 45 | 10 | 0 | 45 | 0 |
| EXAMPLE 3-5 | NOT USED | FEC | 10 | 45 | 10 | 0 | 45 | 0 |
| COMPARISON 3-1 | NOT USED | FEC | 10 | 45 | 10 | 0 | 45 | 0 |
| COMPARISON 3-2 | NOT USED | FEC | 10 | 45 | 10 | 0 | 45 | 0 |
| COMPARISON 3-3 | NOT USED | — | 0 | 45 | 10 | 0 | 45 | 0 |
| COMPARISON 4-1 | NOT USED | TFEC | 10 | 45 | 10 | 0 | 45 | 0 |
| COMPARISON 4-2 | NOT USED | PFEC | 10 | 45 | 10 | 0 | 45 | 0 |
| COMPARISON 4-3 | NOT USED | TFPC | 10 | 45 | 10 | 0 | 45 | 0 |
| COMPARISON 4-4 | NOT USED | FVC | 10 | 45 | 10 | 0 | 45 | 0 |
| COMPARISON 4-5 | NOT USED | ClEC | 10 | 45 | 10 | 0 | 45 | 0 |
| COMPARISON 4-6 | NOT USED | BrEC | 10 | 45 | 10 | 0 | 45 | 0 |
| COMPARISON 4-7 | NOT USED | IEC | 10 | 45 | 10 | 0 | 45 | 0 |
| EXAMPLE 5-1 | NOT USED | FEC + DFEC | FEC: 5 DFEC: 5 | 45 | 10 | 0 | 45 | 0 |
| EXAMPLE 6-1 | NOT USED | DFEC | 10 | 45 | 10 | 0 | 45 | 0 |
| EXAMPLE 6-2 | NOT USED | DFEC | 40 | 45 | 10 | 0 | 45 | 0 |
| EXAMPLE 6-3 | NOT USED | DFEC | 60 | 45 | 10 | 0 | 45 | 0 |
| EXAMPLE 6-4 | NOT USED | DFEC | 80 | 45 | 10 | 0 | 45 | 0 |
| EXAMPLE 6-5 | NOT USED | DFEC | 5 | 45 | 10 | 0 | 45 | 0 |
| EXAMPLE 6-6 | NOT USED | DFEC | 3 | 45 | 10 | 0 | 45 | 0 |
| EXAMPLE 6-7 | NOT USED | DFEC | 1 | 45 | 10 | 0 | 45 | 0 |
| EXAMPLE 6-8 | NOT USED | DFEC | 0.5 | 45 | 10 | 0 | 45 | 0 |
| COMPARISON 6-1 | NOT USED | DFEC | 100 | 45 | 10 | 0 | 45 | 0 |

TABLE 2

| | ANODE THICKNESS | | 5 C/0.2 C | THE HIGHEST TEMPERATURE AT THE | THE HIGHEST TEMPERATURE AT THE |
|---|---|---|---|---|---|
| | BEFORE ASSEMBLY [μm] | AFTER CHARGING [μm] | LARGE CURRENT DISCHARGING CHARACTERISTICS [%] | TIME OF EXTERNAL SHORT CIRCUIT AFTER 1 CYCLE [° C.] | TIME OF EXTERNAL SHORT CIRCUIT AFTER 300 CYCLES [° C.] |
| EXAMPLE 1-1 | 50 | 58 | 97 | 88 | 90 |
| EXAMPLE 1-2 | 50 | 58 | 96 | 85 | 87 |
| EXAMPLE 1-3 | 50 | 58 | 94 | 83 | 84 |
| EXAMPLE 1-4 | 50 | 58 | 88 | 85 | 87 |
| EXAMPLE 1-5 | 50 | 58 | 96 | 89 | 91 |
| EXAMPLE 1-6 | 50 | 58 | 95 | 91 | 94 |
| EXAMPLE 1-7 | 50 | 58 | 92 | 93 | 96 |
| COMPARISON 1-1 | 50 | 58 | 88 | 120 | 135 |

TABLE 2-continued

| | ANODE THICKNESS | | 5 C/0.2 C | THE HIGHEST TEMPERATURE AT THE | THE HIGHEST TEMPERATURE AT THE |
|---|---|---|---|---|---|
| | BEFORE ASSEMBLY [μm] | AFTER CHARGING [μm] | LARGE CURRENT DISCHARGING CHARACTERISTICS [%] | TIME OF EXTERNAL SHORT CIRCUIT AFTER 1 CYCLE [° C.] | TIME OF EXTERNAL SHORT CIRCUIT AFTER 300 CYCLES [° C.] |
| EXAMPLE 1-8 | 50 | 58 | 90 | 107 | 116 |
| COMPARISON 1-2 | 50 | 58 | 40 | 88 | 90 |
| EXAMPLE 1-9 | 50 | 58 | DIFFICULTY IN DISCHARGING | 85 | 86 |
| COMPARISON 1-3 | 50 | 58 | DIFFICULTY IN DISCHARGING | 92 | 96 |
| EXAMPLE 2-1 | 50 | 58 | 98 | 93 | 95 |
| EXAMPLE 2-2 | 50 | 58 | 97 | 88 | 90 |
| EXAMPLE 2-3 | 50 | 58 | 94 | 80 | 82 |
| EXAMPLE 2-4 | 50 | 58 | 82 | 78 | 80 |
| EXAMPLE 2-5 | 50 | 58 | 94 | 97 | 99 |
| EXAMPLE 3-1 | 35 | 40 | 99 | 89 | 91 |
| EXAMPLE 3-2 | 20 | 23 | 100 | 93 | 94 |
| EXAMPLE 3-3 | 55 | 63 | 96 | 89 | 91 |
| EXAMPLE 3-4 | 60 | 69 | 93 | 87 | 89 |
| EXAMPLE 3-5 | 65 | 75 | 86 | 85 | 88 |
| COMPARISON 3-1 | 80 | 92 | 40 | 85 | 92 |
| COMPARISON 3-2 | 70 | 81 | 72 | 85 | 90 |
| COMPARISON 3-3 | 20 | 23 | 98 | 135 | 150 |
| COMPARISON 4-1 | 50 | 58 | 76 | 85 | 87 |
| COMPARISON 4-2 | 50 | 58 | 78 | 86 | 88 |
| COMPARISON 4-3 | 50 | 58 | 75 | 94 | 98 |
| COMPARISON 4-4 | 50 | 58 | 70 | 100 | 107 |
| COMPARISON 4-5 | 50 | 58 | 90 | 120 | 135 |
| COMPARISON 4-6 | 50 | 58 | 75 | 122 | 135 |
| COMPARISON 4-7 | 50 | 58 | 70 | 125 | 140 |
| EXAMPLE 5-1 | 50 | 58 | 98 | 83 | 84 |
| EXAMPLE 6-1 | 50 | 58 | 97 | 86 | 87 |
| EXAMPLE 6-2 | 50 | 58 | 96 | 84 | 86 |
| EXAMPLE 6-3 | 50 | 58 | 95 | 82 | 83 |
| EXAMPLE 6-4 | 50 | 58 | 86 | 85 | 87 |
| EXAMPLE 6-5 | 50 | 58 | 95 | 89 | 91 |
| EXAMPLE 6-6 | 50 | 58 | 94 | 91 | 94 |
| EXAMPLE 6-7 | 50 | 58 | 91 | 93 | 96 |
| EXAMPLE 6-8 | 50 | 58 | 90 | 106 | 114 |
| COMPARISON 6-1 | 50 | 58 | 35 | 88 | 90 |

The followings are apparent from Tables 1 and 2.

Examples 1-1 to 1-8, Examples 6-1 to 6-8, Comparison 1-1

When evaluation results of Examples 1-1 to 1-8 that fluoro ethylene carbonate is included in the electrolytic solution are compared to evaluation results of Comparison 1-1 that fluoro ethylene carbonate is not included in the electrolytic solution, the highest temperature as to batteries of Examples 1-1 to 1-8 at the time of external short circuit is lower than that of Comparison 1-1 and thus the safety is improved.

When evaluation results of Examples 6-1 to 6-8 that difluoro ethylene carbonate is included in the electrolytic solution are compared to evaluation results of Comparison 1-1 that difluoro ethylene carbonate is not included in the electrolytic solution, the highest temperature as to batteries of Examples 6-1 to 6-8 at the time of external short circuit is lower than that of Comparison 1-1 and thus the safety is improved.

However, in the case of the battery of Comparison 1-1, the highest temperature is higher and smoke is not generated. The improvement in safety is estimated to be due to the formation of a stable coating film on the surface of the cathode 21 and/or the anode 22 by allowing the electrolytic solution to include fluoro ethylene carbonate or difluoro ethylene carbonate.

Therefore, in order to improve the safety, it is preferable that at least one of fluoro ethylene carbonate and difluoro ethylene carbonate is included in the electrolytic solution.

Example 1-1, Example 6-1, Example 1-9, Comparison 1-3

The batteries of Examples 1-1 and 6-1 have no PTC element and thus a large current discharging can be achieved. On the other hand, the batteries of Example 1-9 and Comparison 1-3 have the PTC element, and thus it may be impossible to achieve the large current discharging due to operation of the PTC element. As for the battery of Example 1-9, the highest temperature at the time of external short circuit is lower than that of Comparison 1-3. This is because fluoro ethylene carbonate is included in the electrolytic solution of the battery of Example 1-9.

Therefore, the safety of the battery at the time of external short circuit can be improved by allowing the electrolytic solution to include at least one of fluoro ethylene carbonate and difluoro ethylene carbonate even if the PTC element is not used. That is, a battery which is excellent in safety and capable of discharging a large current can be realized.

Examples 1-1 to 1-9, Comparison 1-2, Examples 6-1 to 6-9, Comparison 6-1

When focusing on the evaluation results of Examples 1-1 to 1-10, and Comparison 1-2, it is found that large current discharging characteristics are deteriorated when the content of fluoro ethylene carbonate is increased, while the highest temperature at the time of external short circuit tends to be higher when the content is decreased.

When focusing on the evaluation results of Examples 6-1 to 6-9, and Comparison 6-1, it is found that the content of difluoro ethylene carbonate has the same tendency as that of fluoro ethylene carbonate.

Therefore, in order to balance excellent large current discharging characteristics and excellent safety (suppression of temperature rise at the time of external short circuit), the content of fluoro ethylene carbonate or difluoro ethylene carbonate is preferably 1% by mass or more and 80% by mass or less, more preferably 3% by mass or more and 60% by mass or less.

Examples 2-1 to 2-5

When evaluation results of Examples 2-1 to 2-4 that $LiNi_{0.8}Co_{0.2}AlO_2$, $LiNi_{0.34}Co_{0.33}Mn_{0.33}O_2$, $LiMn_2O_4$, and $LiFePO_4$ are used as the cathode active material are compared to those of Example 2-5 that $LiCoO_2$ is used as the cathode active material, the highest temperature as to the batteries of Examples 2-1 to 2-4 at the time of external short circuit is lower than that of Example 2-5. Particularly, as for the batteries of Examples 2-3 and 2-4, the highest temperature at the time of external short circuit is lower than that of Example 2-5. In Example 2-4 where $LiFePO_4$ is used for the cathode active material, the highest temperature at the time of external short circuit can be reduced, however, large current discharging characteristics tend to be reduced.

Therefore, in order to give a more excellent safety (suppression of temperature rise at the time of external short circuit), it is preferable to use the lithium transition metal composite oxide containing at least one of nickel (Ni), manganese (Mn), and iron (Fe) is used as the cathode active material. It is more preferable to use the lithium transition metal composite oxide containing at least one of manganese (Mn) and iron (Fe) is used as the cathode active material.

Example 1-1, Examples 3-1 to 3-5, Comparisons 3-1 to 3-3

When focusing on the evaluation results of Example 1-1, Examples 3-1 to 3-5, and Comparisons 3-1 to 3-3 where the thickness d of the anode active material layer 22B differs, it is found that 80% or more of large current discharging characteristics can be given when the thickness d of the anode active material layer 22B is set to 65 µm or less before assembly of the battery, and further 90% or more of large current discharging characteristics can be given when the thickness d of the anode active material layer 22B is set to 60 µm or less before assembly of the battery. This is because the electrode area is increased and the current density is decreased when the thickness of the electrode is reduced, thus excellent large current discharging characteristics are given. On the other hand, the electrode area is decreased and the current density is increased when the thickness of the electrode is increased, thus excellent large current discharging characteristics are not given.

When focusing on the evaluation results of Example 3-2 and Comparison 3-3 where the thickness d of the anode active material layer 22B is 20 µm, the battery of Comparison 3-3 is excellent in large current discharging characteristics, however, the highest temperature is higher due to the flow of a high current at the time of external short circuit. On the other hand, the battery of Example 3-2 is excellent in large current discharging characteristics and the highest temperature at the time of external short circuit is also suppressed. This is because fluoro ethylene carbonate is contained in the electrolytic solution in the case of the battery of Example 3-2.

Therefore, in order to improve large current discharging characteristics, the thickness d of the anode active material layer 22B before assembly of the battery is preferably 65 µm or less, more preferably 60 µm or less.

Further, the thickness d of the anode active material layer 22B after charging is preferably 75 µm or less, more preferably 69 µm or less in order to improve large current discharging characteristics.

Example 1-1, Example 6-1, Comparisons 4-1 to 4-7

When evaluation results of Example 1-1 that fluoro ethylene carbonate represented by Chemical Formula (1) is included in the electrolytic solution, Example 6-1 that difluoro ethylene carbonate represented by Chemical Formula (2) is included in the electrolytic solution, and Comparisons 4-1 to 4-7 that cyclic carbonate represented by Formulae (3) to (9) is included in the electrolytic solution are compared, large current discharging characteristics of the batteries of Comparisons 4-1 to 4-7 are lower than those of Examples 1-1 and 1-8. Further, the highest temperature at the time of external short circuit of Comparisons 4-1 to 4-7 is higher than that of Examples 1-1 and 1-8. That is, it is difficult to balance large current discharging characteristics and safety at the time of external short circuit in batteries of Comparisons 4-1 to 4-7.

Therefore, in order to balance large current discharging characteristics and safety at the time of external short circuit, it is preferable to use the electrolytic solution including at least one of fluoro ethylene carbonate represented by Chemical Formula (1) and difluoro ethylene carbonate represented by Chemical Formula (2).

Example 1-1, Example 5-1, Example 6-1

When evaluation results of Example 1-1 that 10% by mass of fluoro ethylene carbonate is used alone, Example 6-1 that 10% by mass of difluoro ethylene carbonate is used alone, and Example 5-1 that 5% by mass of fluoro ethylene-carbonate and 5% by mass of difluoro ethylene carbonate are mixed for use are compared, large current discharging characteristics of the battery of Example 5-1 can be improved more than those of the batteries of Examples 1-1 and 6-1 and the highest temperature at the time of external short circuit tends to be suppressed.

Therefore, it is preferable to use the electrolytic solution including both difluoro ethylene carbonate and fluoro ethylene carbonate in order to realize excellent large current discharging characteristics and further suppress the highest temperature at the time of external short circuit.

For example, the numerical values described in the embodiments and Examples are merely examples and different numerical values from those may be used if necessary.

The case where the present application is applied to the nonaqueous electrolyte secondary battery having a cylindrical shape has been described in the above-mentioned embodiments and Examples. The present application can be applied to nonaqueous electrolyte secondary batteries having a coin shape, a button shape, a square shape, or other shapes such as a sheet shape in which an exterior member of the battery is formed by lamination.

Further, the case where the present application is applied to the nonaqueous electrolyte secondary battery having a The invention is claimed as follows:

1. A battery comprising:
    an anode, a cathode and an electrolyte;
    wherein the electrolyte includes one or both of fluoro ethylene carbonate and difluoro ethylene carbonate in an amount of 0.5% by mass or more and 10% by mass or less,
    wherein the anode includes an anode active material layer provided on an anode current collector, and
    wherein a thickness of the anode active material layer, after charging the battery, is 58 um or more and 75 um or less;
    wherein a ratio of a discharge capacity B, when discharging at a 5 C rate, to a discharge capacity A, when discharging at a 0.2 C rate, ((B/A)×100%) is 80% or more.

2. The battery according to claim 1, wherein the thickness of the anode active material layer, after charging the battery, is 63 um or more and 69 um or less.

3. The battery according to claim 1, wherein the battery does not include a positive temperature coefficient element.

4. The battery according to claim 1, wherein the anode current collector includes a first surface and a second surface, and wherein the anode active material layer is provided on the first and second surfaces of the anode current collector.

5. The battery according to claim 1, wherein the anode active material layer includes a first active material that includes carbon.

6. The battery according to claim 5, wherein the anode active material layer further includes a second active material that includes silicon.

7. The battery according to claim 6, wherein the second active material further includes one or both of oxygen and carbon.

8. The battery according to claim 1, wherein the cathode includes a cathode active material,
    wherein the cathode active material includes one or both of a composite oxide including lithium and a transition metal element, and a phosphoric acid compound including lithium and a transition metal element.

9. The battery according to claim 8, wherein the transition metal element is one or more of nickel, manganese and iron.

10. The battery according to claim 8, wherein the composite oxide has a spinel-type structure.

11. The battery according to claim 8, wherein the composite oxide is expressed by a formula $Li_xMIO2$ and the phosphoric acid compound is expressed by a formula $Li_yMIIPO4$,
    wherein MI and MII represent one or more transition metal elements, and wherein $0.05 \leq x \leq 1.10$, and wherein $0.05 \leq y \leq 1.10$.

12. The battery according to claim 8, wherein the composite oxide is any one of a lithium cobalt composite oxide, a lithium nickel complex oxide, and a lithium nickel cobalt composite oxide.

13. The battery according to claim 8, wherein the phosphoric acid compound is any one of a lithium-iron phosphoric acid compound, and a lithium-iron manganese phosphoric acid.

14. The battery according to claim 1, further comprising a battery can configured to accommodate a battery lib and a safety valve, wherein the safety valve directly contacts at least part of the battery lib.

15. The battery according to claim 14, wherein the battery can is a cylindrical can.

16. The battery according to claim 15, wherein a diameter of the battery can is about 18 mm and a height of the battery can is about 65 mm.

17. The battery according to claim 1, wherein the discharge capacity B is evaluated based on a first condition when the battery is charged at 2 C rate at 25° C. followed by a constant voltage condition to 4.2V, and then performs a first discharge at 5 C rate at 25° C. to 3V, and wherein the discharge capacity A is evaluated based on a second condition when the battery is charged at 2 C rate at 25° C. followed by the constant voltage condition to 4.2V, and then performs a second discharge at 0.2 C rate at 25° C. to 3V.

18. The battery according to claim 1, wherein the electrolyte contains a high boiling point solvent having a boiling point higher than 150° C. in atmospheric pressure and a low boiling point solvent having a boiling point lower than 150° C. in atmospheric pressure.

19. The battery according to claim 18, wherein the high boiling point solvent includes one or more of cyclic carbonates, lactones, lactams, and cyclic sulfones, and wherein the low boiling point solvent includes at least one of chain carbonates, chain carboxylates, ketones, ethers, chain amides, and chain carbamates.

20. The battery according to claim 1, wherein the electrolyte includes fluoro ethylene carbonate and difluoro ethylene carbonate.

21. The battery according to claim 1, wherein the one or both of fluoro ethylene carbonate and difluoro ethylene carbonate is capable of suppressing an increase in temperature associated with the battery.

22. An electrical apparatus comprising the battery according to claim 1.

23. A power tool comprising the battery according to claim 1.

24. An electrical vehicle comprising the battery according to claim 1.

25. A hybrid vehicle comprising the battery according to claim 1.

* * * * *